June 5, 1928.
J. S. OGSBURY
1,672,277
SCALE
Filed June 17, 1924
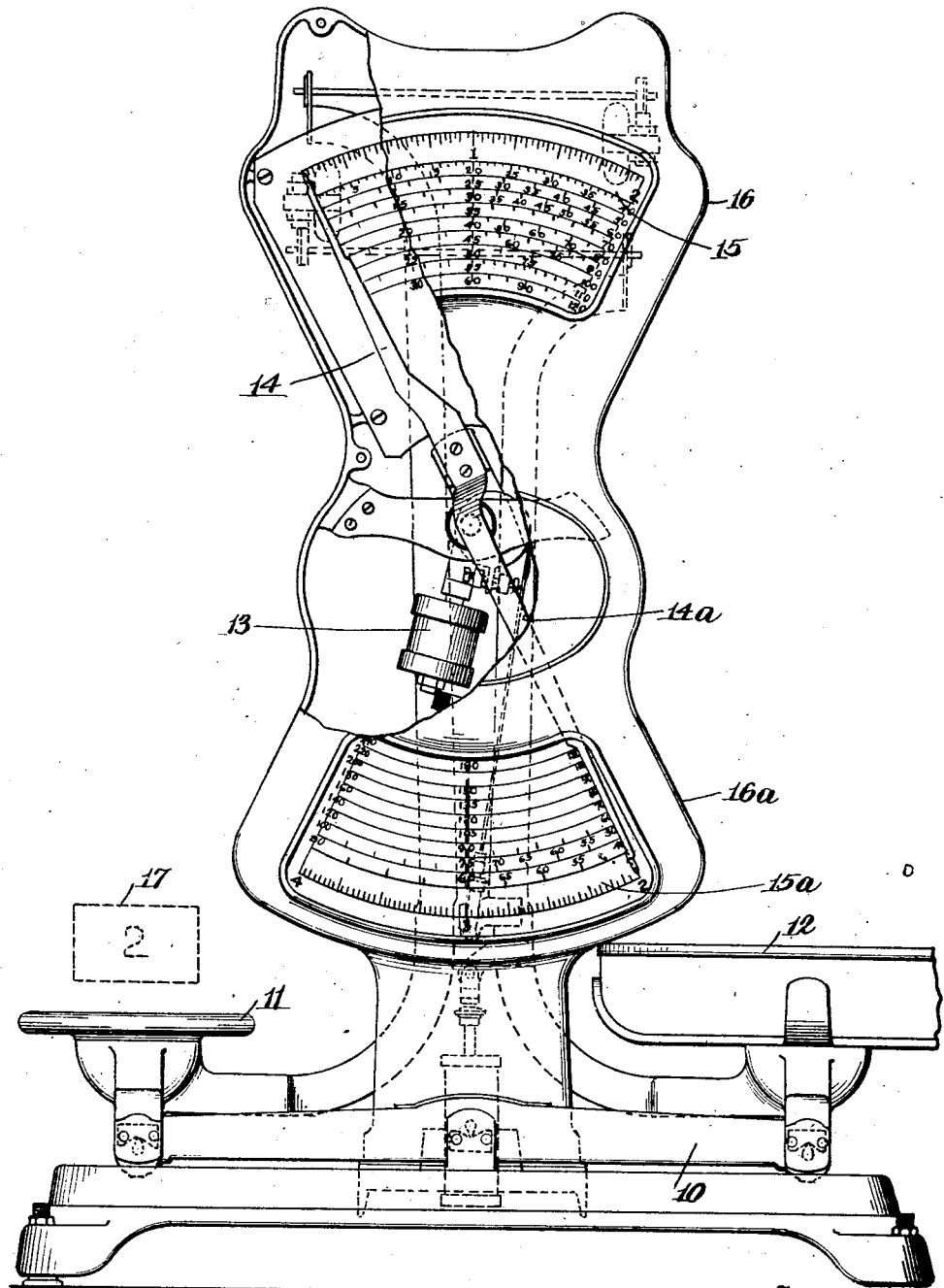
Inventor
James S Ogsbury
By his Attorneys
Cooper, Kerr + Dunham Patented June 5, 1928.

1,672,277

UNITED STATES PATENT OFFICE.

JAMES S. OGSBURY, OF DAYTON, OHIO, ASSIGNOR TO DAYTON SCALE COMPANY, OF DAYTON, OHIO, A CORPORATION OF NEW JERSEY.

SCALE.

Application filed June 17, 1924. Serial No. 720,533.

The present invention is directed to improvements in scales and more particularly is directed to the improvement of the well known fan type of automatic scale in order that the computing capacity, chart range or price range may be increased.

The drawing shows one embodiment of my invention.

The weighing scale to which my improvements are shown applied is of a type now on the market and known to the trade as a Dayton No. 221 scale. It embodies an even balance beam 10 supporting two pans 11 and 12 adapted for weights and applied loads. Automatic counterbalancing is secured for the lower weight ranges by means of a pendulum 13 and the automatically counterbalanced load is indicated by a pointer 14 sweeping over a weighing and computing chart 15 fixed in a chart housing 16.

In order to provide increased indicating capacity I provide a supplemental chart housing 16a supporting an indicating chart 15a. The chart 15a is traversed by a pointer or indicator 14a which is either integral with or connected to pointer 14 so as to move in unison therewith. Preferably the parts are arranged so that the weight of pointer 14a counterbalances the weight of pointer 14. The indicia on the chart 15 are preferably arranged from left to right and from right to left on chart 15a. For example, with chart 15 graduated from 0 to 2#, pointer 14 would point to 0 on chart 15 while pointer 14a would point to 2# on chart 15a. With pointer 14 opposite the 2# graduation on chart 15 pointer 14a would point to the 4# graduation on chart 15a. When the user of the scale desired to weigh articles over 2# in weight, and not over 4#s, a 2# weight 17 will be applied to the weight pan 11. This restores the pointer assembly in a counterclockwise direction to an extent equivalent to 2#s of automatically counterbalanced load. The user would then read the entire applied load directly from chart 15a. In this manner the capacity of the usual chart may be increased and it is possible to directly read off the total offset loads from the lower chart. With loads under 2# the user would not apply the 2# weight 17 to pan 11 and would read the load directly from the upper chart 15.

It will be understood that the multiple charts can be graduated in any desired manner, with any desired weight graduations and price graduations. It is only necessary that the weight range of one chart correspond with the weight range on the other.

If it is only desired to increase the number of prices which can be directly displayed by the scale, the weight graduations would be the same on both charts but the price graduations would be different. No supplemental weight would then be applied but the user would read the same weight directly from both charts and would select at will the desired price per unit reading from either chart.

What I claim is—

1. A weighing scale of the automatically counterbalanced type having a weight pan adapted to receive applied weights to coact with the load counterbalancing means and to restore the parts of the indicating element toward zero, a main indicating chart, an indicator traversing the chart and controlled by the automatic load counterbalancing parts of the scale, a supplementary chart graduated with indicia corresponding in range to the indicia of the main chart, and a supplemental separate indicator swinging in unison with the indicator traversing the main chart and cooperating with the indicia of the supplementary chart for the purpose described.

2. A weighing scale including a beam carrying a load pan and a weight pan, automatic load counterbalancing means connected to said beam, an indicating assembly comprising a double ended pointer controlled in its movement by the load counterbalancing means, a dual chart structure, comprising an upper and lower fan-shaped chart traversed by said double indicator, said chart structure including one chart graduated to directly represent the automatically counterbalanced load and said second chart being graduated and provided with indicia representing the capacity of the automatically counterbalanced load supplemented by a load as offset by a weight applied to the weight pan.

3. A weighing scale including in combination with a scale beam, automatic load counterbalancing means, means for applying weights to react upon said scale beam and to restore it and the load counterbalancing means when the automatic counterbalancing capacity of the scale is reached, a pivotally mounted indicating means controlled in its movement thereby, a plurality of charts traversed by said indicating means, each and all of said charts being simultaneously visible, one being below and the other above the pivot of the indicator, one of the aforesaid charts being graduated to directly represent the automatically counterbalanced load and another of the concurrently viewable charts being provided with indicia representing the automatically counterbalanced load augmented by the load offset by applied weight.

4. A weighing scale including an automatic load counterbalancing means and a pivotal indicator means, means for receiving applied weight to a moving part of the scale to restore the automatic load counterbalancing means when its capacity is reached, a plurality of charts variously angularly disposed about the pivotal axis of the indicator, one chart being graduated to directly show the automatically counterbalanced load and another chart being graduated to directly show the automatically counterbalanced load augmented by the load offset by applied weight.

5. A weighing scale having automatic load counterbalancing means, a load pan and a weight pan, said weight pan receiving weight to act cumulatively with the automatic load counterbalancing means and to restore the parts of the scale toward zero position, a plurality of constantly visible indicating charts, and indication structure with radiating portions thereof traversing the various charts and controlled in its movement by the automatic load counterbalancing means, one chart being directly graduated to show the amount of the load up to the capacity of the automatic counterbalanced means, and another chart showing the amount of load counterbalanced by the automatic means supplemented by the load offset by applied weight on the weight pan.

In testimony whereof I hereto affix my signature.

JAMES S. OGSBURY.